United States Patent [19]
Marshall et al.
[11] 3,755,656
[45] Aug. 28, 1973

[54] DATA PROCESSING SYSTEM

[75] Inventors: Edward C. Marshall, Upper Montclair; Paul E. Stanford, Bloomfield, both of N.J.
[73] Assignee: Litton Business Systems, Inc., New York, N.Y.

[22] Filed: Feb. 26, 1971
[21] Appl. No.: 119,231

[52] U.S. Cl. .............. 235/61.11 C, 101/19, 234/35, 235/61.12 R, 235/61.11 R
[51] Int. Cl. ...... B44b 5/00, G06k 1/20, G06k 7/04, G06k 19/06
[58] Field of Search ................. 101/19, 17, DIG. 23; 235/61.12 R, 61.11 B, 61.11 C, 61.7 R, 61.6 K, 133; 340/149 A, 365 E; 234/35

[56] References Cited

UNITED STATES PATENTS

| | | | |
|---|---|---|---|
| 3,390,629 | 7/1968 | Parenti | 101/19 |
| 3,609,303 | 9/1971 | Marshall | 235/61.11 C |
| 3,519,202 | 7/1970 | Rogers | 234/35 |
| 3,128,372 | 4/1964 | Braun | 235/61.11 B |
| 3,548,160 | 12/1970 | Welsh | 235/61.6 R |
| 3,576,429 | 4/1971 | Thauland | 235/61.11 C |
| 2,857,001 | 10/1958 | Braun | 235/61.11 B |
| 3,051,079 | 8/1962 | Platzman | 101/19 |

*Primary Examiner*—Daryl W. Cook
*Assistant Examiner*—Robert M. Kilgore
*Attorney*—Norman Friedman, Stephen E. Feldman, Arthur T. Groeninger and Morris I. Pollack

[57] ABSTRACT

Each of the value entering slides of a print-punch machine has associated with it a perforate indicia sensing slide of a record reader. Each sensing slide in response to sensing an indicia, during relative movement between the sensing slide and the data record, is either slid proportionate to the value of the indicia sensed or set to a position permitting manual operation of the associated print-punch value entering slide. Any sliding movement of the indicia setting slides results in a corresponding movement of the associated print-punch value entering slides. A checking means determines that the data record has been properly read by moving into a space which is open when each indicia sensing member has either sensed an indicia in its column or is set to the manual entry position. When said space is blocked the checking means provides on indication that one or more sensing members has not functioned properly.

11 Claims, 13 Drawing Figures

INVENTORS
EDWARD C. MARSHALL
PAUL E. STANFORD
BY
ATTORNEY

INVENTORS
EDWARD C. MARSHALL
PAUL E. STANFORD
BY
ATTORNEY

INVENTORS
EDWARD C. MARSHALL
PAUL E. STANFORD
BY
ATTORNEY

INVENTORS
EDWARD C. MARSHALL
PAUL E. STANFORD
BY
ATTORNEY

INVENTORS
EDWARD C. MARSHALL
PAUL E. STANFORD
BY
ATTORNEY

INVENTORS
EDWARD C. MARSHALL
PAUL E. STANFORD
BY
ATTORNEY

INVENTORS
EDWARD C. MARSHALL
PAUL E. STANFORD
BY
ATTORNEY

INVENTORS
EDWARD C. MARSHALL
PAUL E. STANFORD
BY
[signature]
ATTORNEY

INVENTORS
EDWARD C. MARSHALL
PAUL E. STANFORD
BY
ATTORNEY

DATA PROCESSING SYSTEM

BACKGROUND OF THE INVENTION — FIELD OF INVENTION

The invention relates to data processing systems and more particularly to a device for reading the indicia carried by a data record utilized by said system and for controlling the value entry of a business machine in response thereto.

BACKGROUND OF THE INVENTION — DESCRIPTION OF PRIOR ART

Data records exist in many shapes and forms and the data recorded thereon also may take many shapes and forms with perforations, conductive marks, magnetic marks, and optical bars being the most common.

Prior art record readers which sense, store and process indicia electrically or electronically are usually complex in construction and expensive in cost, and may at times be difficult to operate. In addition, most such electrical or electronic record readers present a highly inefficient situation when the information sensed is to be utilized for the purpose of operating the value entering instrumentalities of a business machine and more especially of those business machines utilized for printing and/or punching. Such instrumentalities are almost invariably mechanical and usually require mechanical translation of racks and gears. The conversion of the electrically and electronically sensed and stored data into the required mechanical movement with existing devices is thus usually a complex and costly proposition.

In most prior art devices which directly sense the indicia and translate same into a corresponding mechanical movement, such as shown in U.S. Pat. No. 2,508,603 to Gollwitzer, there is lacking an ability to perform checks upon the mechanical sensing means to determine whether they have properly functioned.

The great majority of prior art devices, furthermore, lack versatility. They do not permit the operator to select, through the record reader, which business machine instrumentalities are to be controlled by the record reader and which are to be controlled by the operator for manual entry of data into the business machine.

Some business machines and data processing devices therefore, only have manual data entry. To enter data under control of a record reader which lacks means to check the functioning of the sensing elements therein would be to take an undue risk. To enter data under control of a record reader which does not provide for selected manual data entry demonstrates a failure to understand modern business practices. This is especially true in the setting up for operation of business machines where the data entered is to be used time and time again in the repeated operation of the machine; such as in a print-punch machine of the type shown in U.S. Pat. No. 2,708,873 to K.J. Braun. In the operation of such a machine it is important that the data entered be entered accurately or the tickets printed and punched by the machine will be wasted. Controlling the operation of such a machine by a record reader is only feasible if the functioning of the sensing elements of the reader can be checked. At the same time the versatility of selectable automatic and manual entry into the print punch machine is a must.

SUMMARY OF THE INVENTION

It is therefore an object of this invention to provide an improved data processing system.

It is a further object to provide an improved record reader for a data processing system.

A still further object is to provide an improved record reader for reading indicia on a data record and directly, through mechanical means, operating the instrumentalities of a business machine.

Still another object is to provide an improved record reader which mechanically senses the indicia carried by a record to control the printing and/or punching instrumentalities of a business machine and more especially a print-punch machine.

It is still another object to provide an improved input device for controlling the operation of a business machine and more especially of a print-punch machine wherein one can selectively determine which instrumentalities of the machine are to be controlled directly by the input device and which are to be left free for manual operation by the operator.

It is yet still another object of the invention to provice an improved input device having mechanical elements to the displacable to one of a plurality of selected positions and having means for checking said mechanical elements to determine whether they have functioned properly.

This invention involves an input device incorporating mechanical elements displacable to one of a plurality of selectable positions; and contemplates providing means for selectively controlling some of said mechanical elements in a first predetermined manner to directly position some of the instrumentalities of a business machine and others of said mechanical sensing elements in a second predetermined manner to permit other instrumentalities of the business machine to be positioned directly by the operator. It further contemplates providing checking means to determine whether said mechanical elements have functioned properly.

In carrying out the invention, accordingly to a preferred embodiment, the input device is controlled by a data record and there is provided a mechanical sensing element for each column of the record to be read. The sensing elements are disposed so that, upon relative displacement between the record to be read and the sensing elements, there is a displacement of the sensing elements by an amount corresponding to the values represented by the indicia carried by the record. The sensing elements are constructed for interconnection to the displacable element of a business machine which in turn position the printing and the punching mechanisms therein. Thus displacement of the sensing elements results in a corresponding displacement of the printing and punching instrumentalities in the business machine. The mechanical sensing elements are furthermore constructed such that, in a predetermined condition thereof, and under control of indicia disposed in a predetermined row on the data record, the interconnected instrumentalities of the business machine are freed to permit manual selection of the information to be entered into the business machine directly by the operator. Checking means furthermore determine that all the sensing elements have, in fact, sensed indicia after the sensing elements passed over the data record and prior to utilization by the business machine of the data sensed.

Other objects, features, and advantages of the invention in its details of construction and arrangement of parts will be seen from the above, from the following description of the preferred embodiment when considered in conjunction with the drawings, and from the appended claims.

BRIEF DESCRIPTION OF THE DRAWINGS

In the Figures.

DESCRIPTION OF PREFERRED EMBODIMENT

Figure 10:
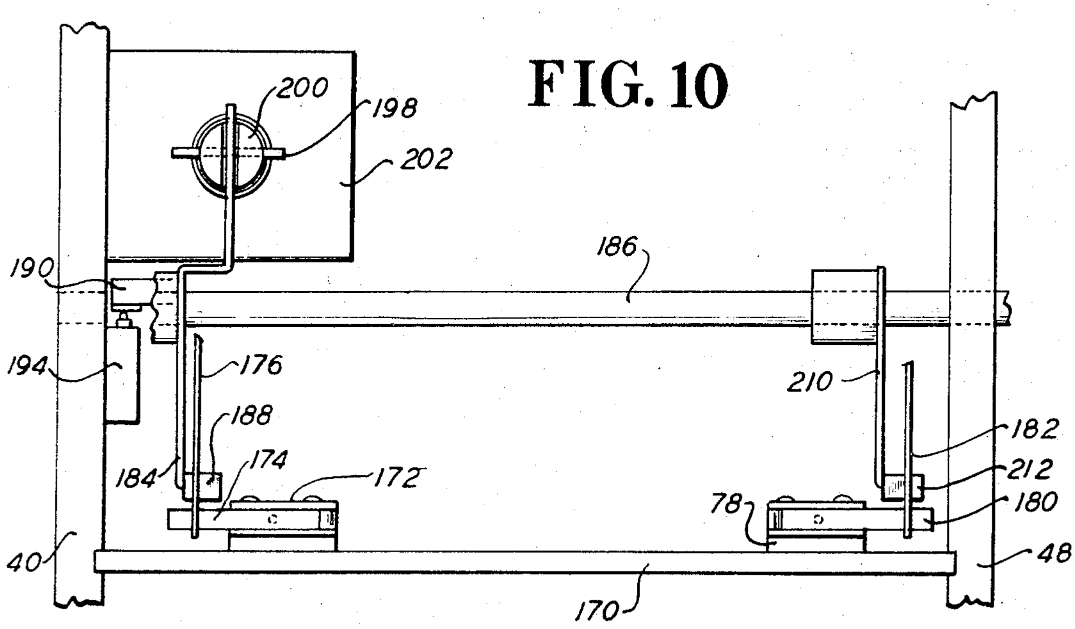
FIG. 10 is a schematic showing of a reader sensing element interconnected to its associated printing and punch control structure of the business machine in FIG. 1.

For convenience the invention will be described as applied to a business machine adapted to print and punch information onto a tag or label. Values may be entered into the machine by a keyboard having elements which are manually displacible to shift value entry slides between one of a plurality of value selection positions. This action positions type wheels to set up the value to be printed, and punch interposers to facilitate punching of the corresponding information into the tag or label.

A record reader, embodying the present invention, is associated with the print-punch machine in such a way that indicia sensing slides provided in the record reader are directly interconnected with the value entry slides of the print-punch machine; there being an indicia sensing slide in the record reader for each value entry slide in the print-punch machine. A control data record, of the IBM type, having perforations disposed in a number of columns corresponding to the number of value entry slides of the print-punch machine, is displaced with respect to the record reader indicia sensing slides. The slides, upon sensing perforated indicia in the record, project through the indicia and are carried along with the card a distance corresponding to the value of the indicia. The disposition of perforations in the "12" position of the data record permits fingers to pass up through the card to raise the corresponding indicia sensing slides and permit manual operation of the print-punch machine keyboard by the operator to select the values to be entered in these columns. After a check has been performed to determine that all the indicia sensing slides have functioned properly, the print-punch machine performs its cycle of operations to print and punch a selected number of items. It being understood, nevertheless, that without the departing from the invention; that the control record need not be of the IBM type but may be of any type as long as it carries indicia for sensing and to effect displacement of the indicia sensing member, that any predetermined location on the control record may be used for setting the indicia sensing members to permit manual entry into the business machines; that the movement of the indicia sensing members may be other than rectilinear; that the movement of the sensing members may be controlled by means other than a data record; that the instrumentalities to which values are entered may be in addition to printing and punching instrumentalities be indicators, electrical commutator bars, or any other instumentality having a plurality of selectively settable positions; that the business machine need not necessarily be a print-punch machine but may be a machine that prints, punches, indicates, performs calculations, or processes data in any other way; and for that matter that the machine need not necessarily be a business machine but may be any device having one or more elements which are selectively settable between one or more of a plurality of positions.

Figure 1:
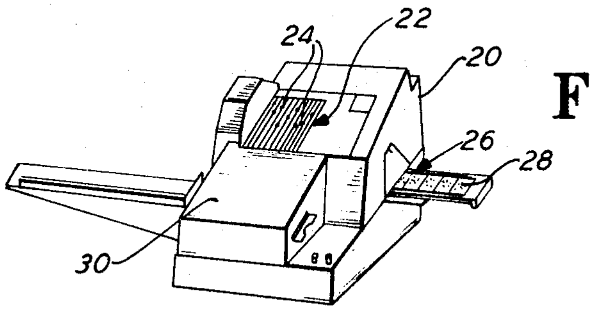
FIG. 1 is a schematic isometric showing of a business machine having attached thereto an input device in the form of a record reader embodying the present invention.

With reference to FIG. 1 there is generally shown at 20 a print-punch machine, of the type shown in U.S. Pat. No. 2,708,873 to K.J. Braun, having a keyboard 22 including a plurality of keys 24 movable by the operator between positions represenative of the values 9 through 0. Print-punch machine 20 utilizes tags 26 which machine 20 processes by printing and perforation thereon to provide record data records 28.

Figure 2:
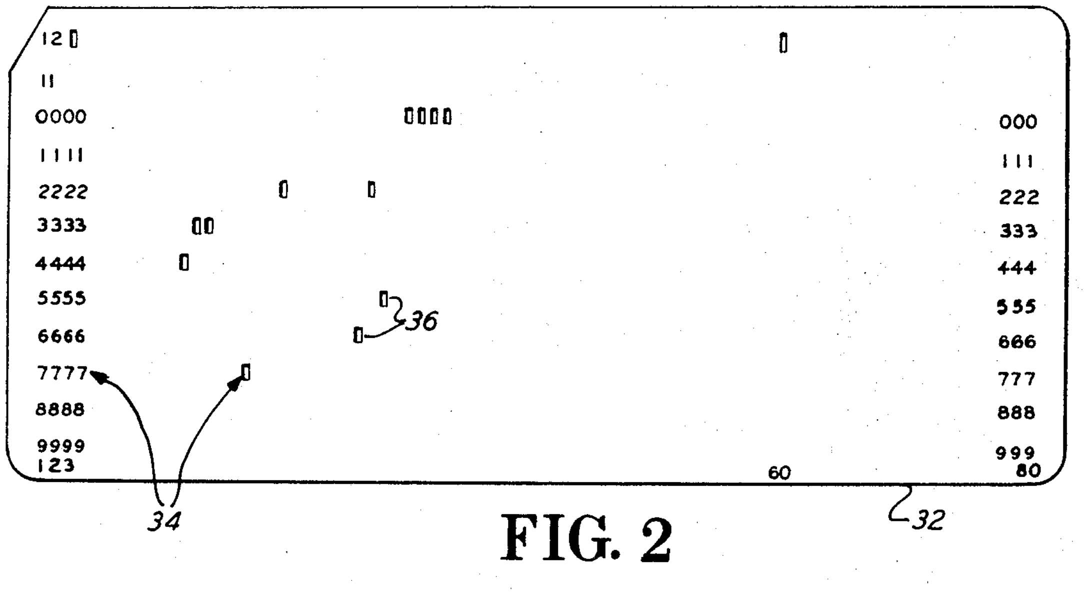
FIG. 2 is a representation of a typical record member for use with the reader in FIG. 1.

Associated with machine 20 is a record reader 30 adapted to read a control record 32 (FIG. 2), of the IBM type, having 12 rows and up to 80 columns of indicia bit positions 34 designated, in a conventional manner, from 9 to 0 and 11 and 12. The columns of record 32 are designated 1 through 80 as shown along the bottom edge of record 32 in FIG. 2. When record 32 is encoded, through the use of conventional punching equipment, a single perforation 36 is disposed in a selected row of those columns of record 32 to be used.

Figure 3:
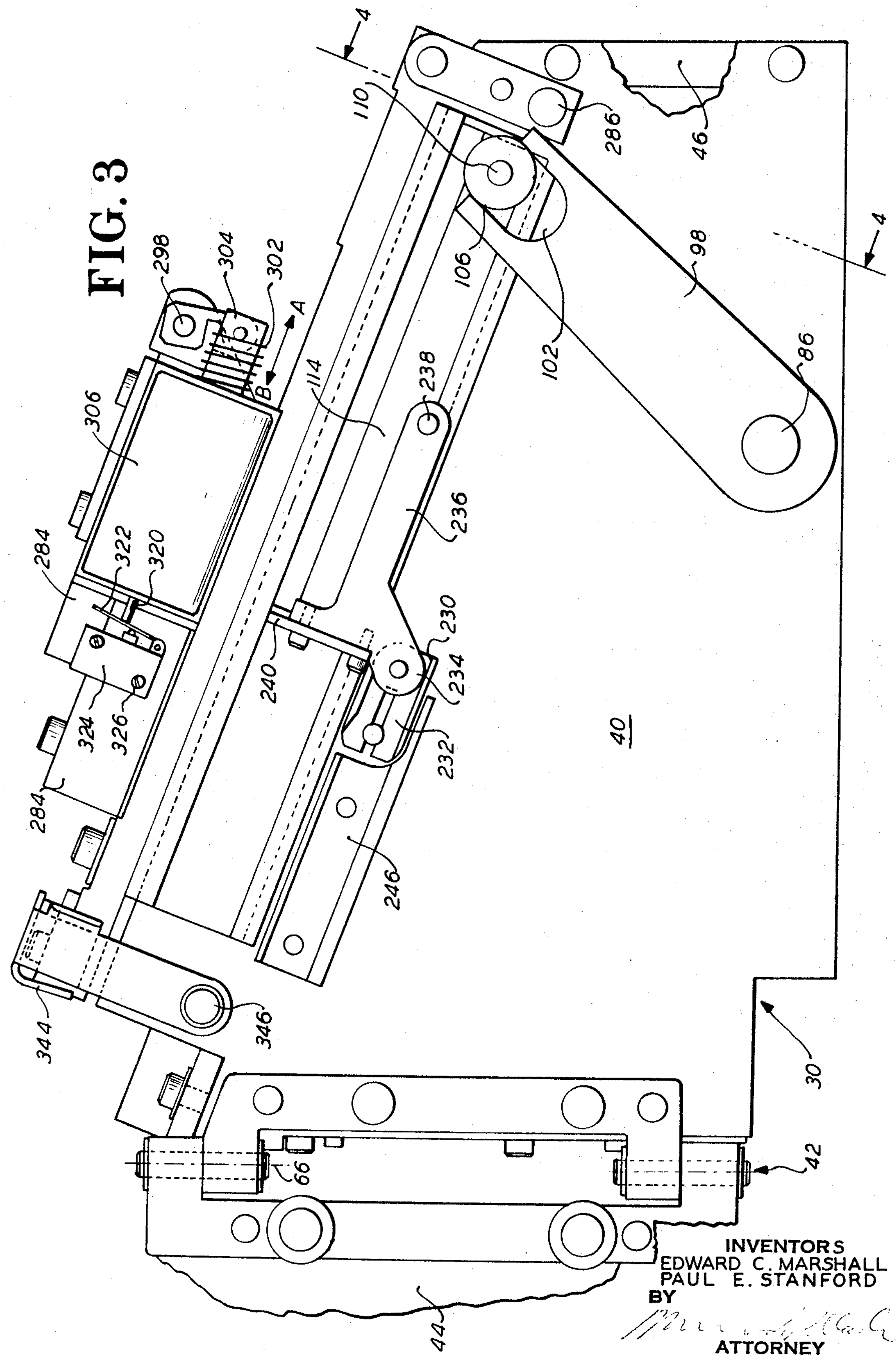
FIG. 3 is an elevational view of the left side of the record reader of FIG. 1 with casing removed to better show details thereof.
Figure 4:
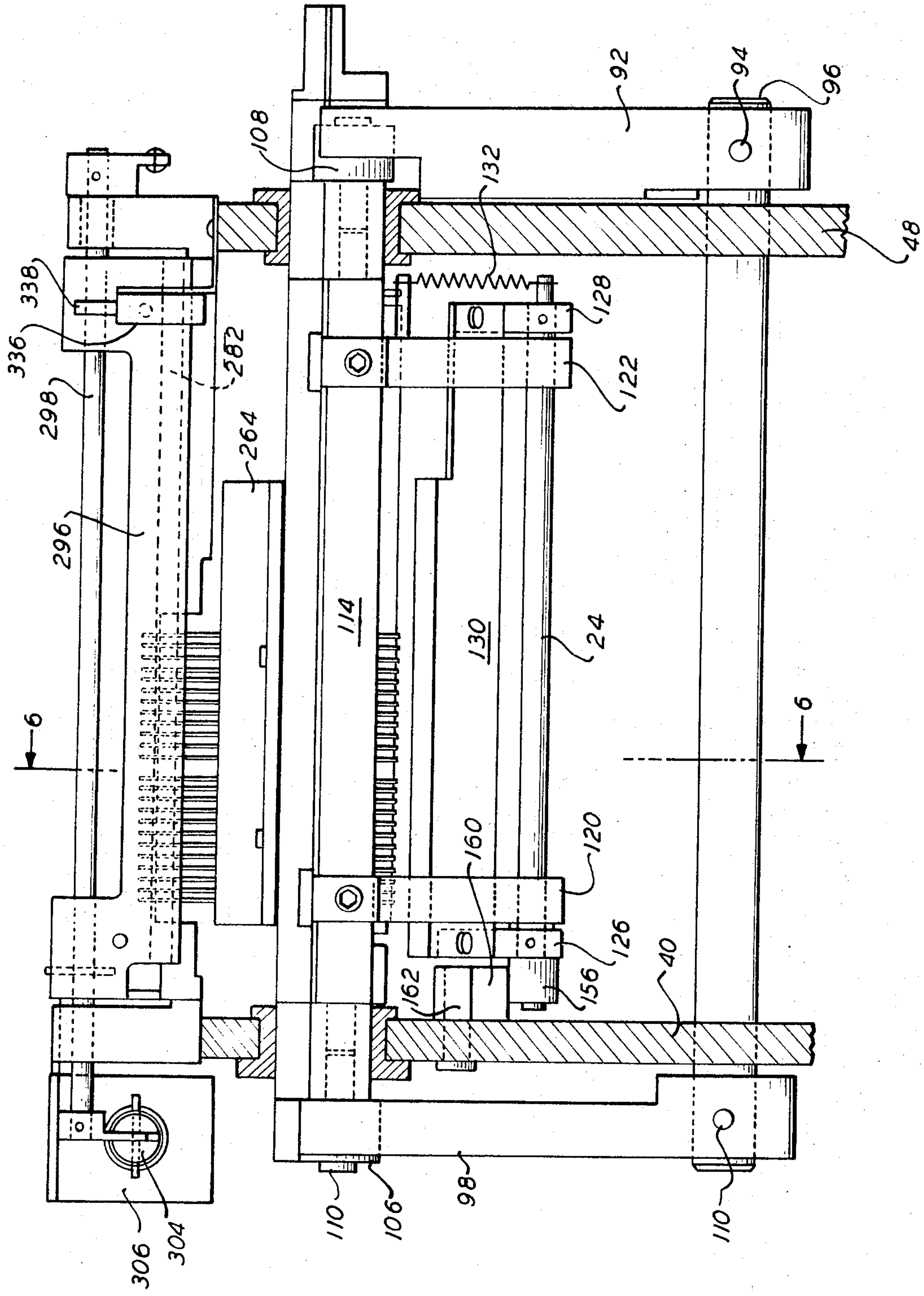
FIG. 4 is a vertical section view taken on line 4—4 of FIG. 3.
Figure 5:
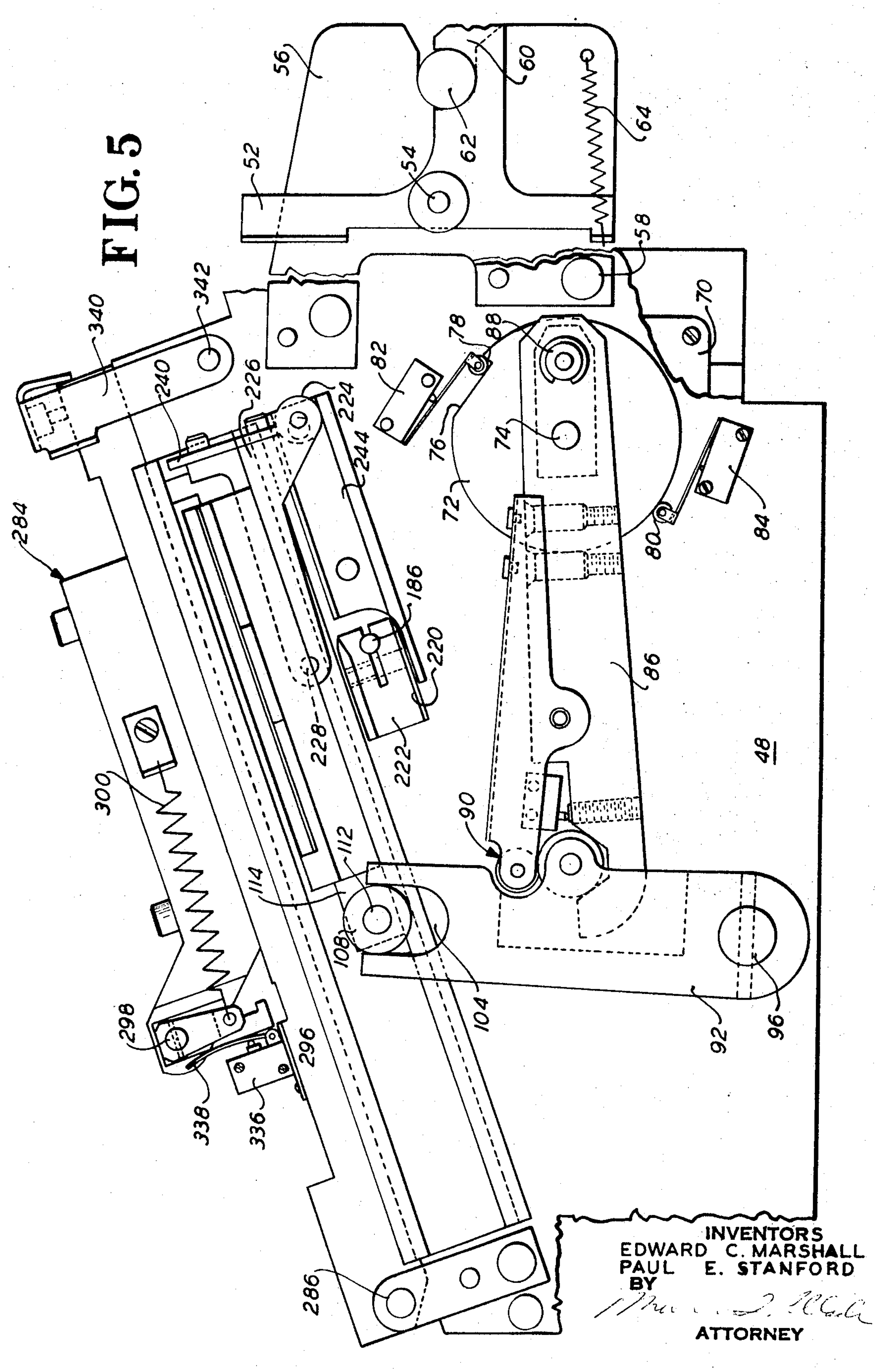
FIG. 5 is an elevational view of the right side of the reader with casing removed to better show details thereof.

A left side wall 40 (FIGS. 3 and 4) of the record reader 30 is suitably interconnected by a hinge assembly 42 to a left side plate 44 of machine 20. A front wall 46 (FIG. 3) interconnects left side plate 40 to a right side wall 48 (FIGS. 4 and 5). Other suitable interconnecting means (not shown) serve to firmly and securely position walls 40, 46, and 48. A latch 52 (FIG.5), pivoted as at 54 to a latch plate 56 suitably connected as at 58 to right side wall 48, is provided with a hook 60 adapted to grab a transverse connecting bar 62 which serves to interconnect left side plate 44 of machine 20 with an opposite right side plate (not shown) of machine 20. A spring 64 connected at one of its ends to latch 52 and its other end to latch plate 56 rocks latch 52 in the counterclockwise direction (FIG. 5) about its pivot 54 to engage hook 60 over bar 62. The rocking of latch 52 in the clockwise direction about its pivot 54 and against the action of spring 64 releases hook 60 from bar 62 to permit movement of record reader 30 about an axis of rotation 66 of hinge assembly 42 to provide access to the instrumentalities within print-punch machine 20 and record reader 30.

Suitable motive power means are provided for reader 30 in the form of a motor 70 (FIG. 5) connected to the inner wall of right side wall 48. Appropriate mechanism (not shown) interconnects motor 70 to a plate cam 72 (FIG. 5) to drive same in the clockwise direction (FIG. 5) about a drive shaft 74. A cam notch 76 is formed in cam 74 for coaction with rollers 78 and 80 of switches 82 and 84 respectively which are suitably interconnected into the circuitry as will be hereinafter explained.

A drive bar 86 eccentrically pinned as at 88 to cam 72, is interconnected as at 90 to a right drive arm 92 (FIGS. 4 and 5) pinned as at 94 (FIG. 4) to a cross shaft 96 journaled between left side wall 40 and right side wall 48. A left drive arm 98 (FIGS. 3 and 4) is pinned at at 100 to cross shaft 96 and is formed with a slot 102 corresponding to a slot 104 in right drive arm 92.

Figure 6:
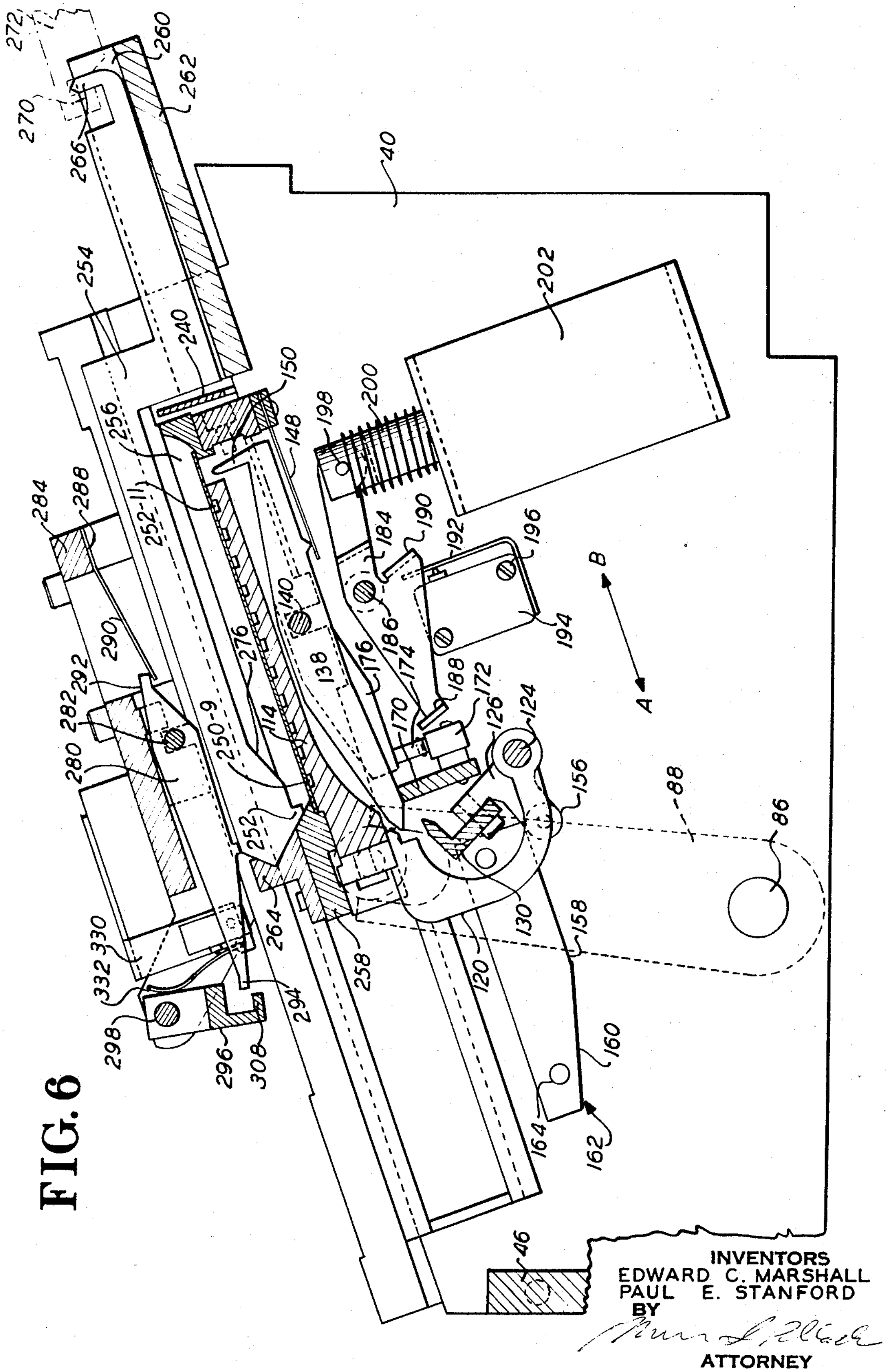
FIG. 6 is a sectional view taken on line 6—6 of FIG. 4.
Figures 7, 8:
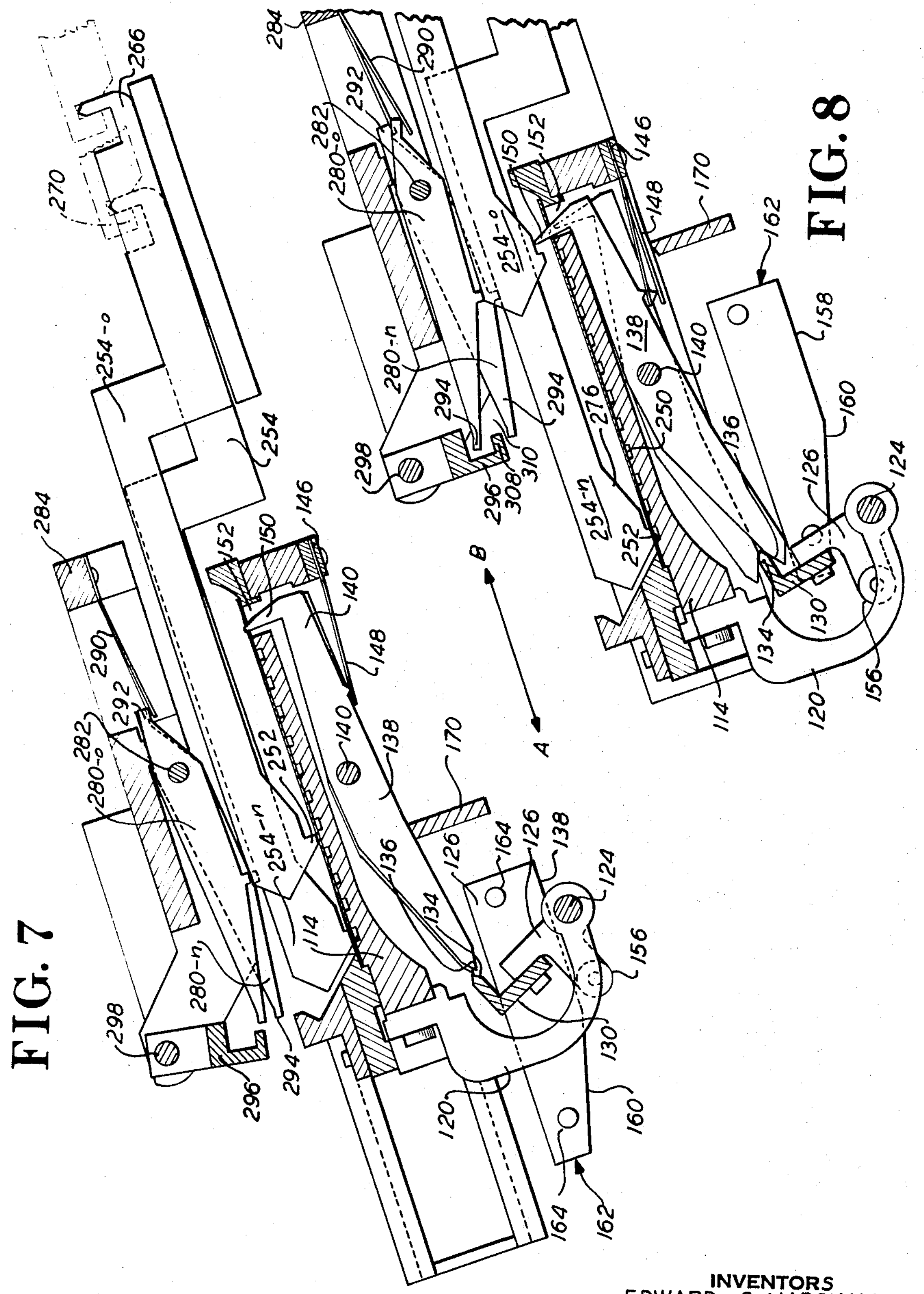
FIG. 7 is a view similar to FIG. 5 with some elements removed to better show the details of the indicia sensing elements following inception of the machine cycle.
FIG. 8 is a view similar to FIG. 7 but showing the elements at the end of the sensing portion of a cycle.
Figure 9:
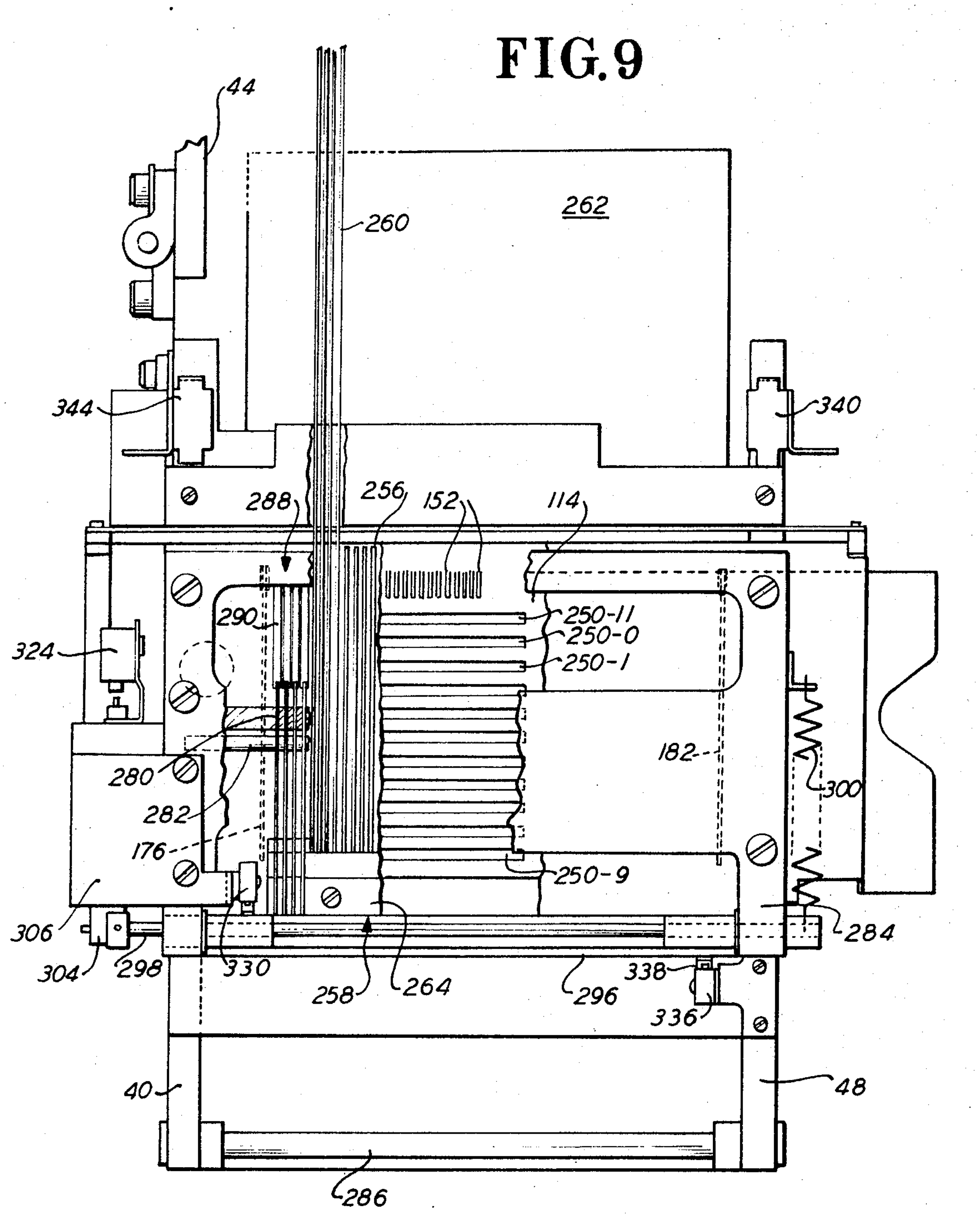
FIG. 9 is a top view of the reader of FIG. 1 with its casing and some of the elements removed, and in partial section, to better show details thereof.

Slots 102 and 104 are adapted to receive drive rollers 106 (FIGS. 3 and 4) and 108 (FIGS. 4 and 5) respectively, which are rotatably disposed on pins 110 and 112 carried by a record card table 114 (FIGS. 4 and 6). A pair of support arms 120 (FIGS. 4 and 7) and 122 (FIG. 4) extend downwardly from table 114 to journal a lifter control shaft 124 to which is fixedly secured a pair of lifter bell cranks 126, 128 (FIG. 4) mounting a lifter control blade 130 (FIGS. 4 and 7). A spring 132 (FIG. 4) having one of its ends connected to support arm 122 and its other end connected to bell crank 128 urges bell crank 128, shaft 124, bell crank 126, and control blade 130 in the clockwise direction (FIG. 7) about the axis of rotation of the shaft 124 to set a nose 134 (FIG. 8) of lifter control blade 130 into a position of coaction with faces 136 of lifter arms 138 rockably mounted on a pivot shaft 140 (FIGS. 7 and 8) suitably carried by table 114. A spring comb 146 (FIG. 8) is suitably connected to the under side of table 114. It is formed with a plurality of spring fingers 148 which are normally biased against the under side of lifter arms 138 to urge same in the counter-clockwise direction about pivot shaft 140 to project lifter fingers 150 formed on the ends of lifter arms 138 through lifter apertures 152 (FIGS. 8 and 9) formed in table 114.

A cam follower roller 156 (FIGS. 4 and 6) is carried by bell crank 126 for coaction with cam surfaces 158 (FIG. 6) and 160 (FIGS. 4 and 6) of a cam block 162 secured as at 164 to left side wall 40. When table 114 is in a "table rear" position as shown in FIG. 6, cam follower roller 156 rests on cam surface 158 of cam block 162 and nose 134 of control blade 130, is withdrawn from faces 136 of lifter arms 138 and against the action of spring 132 as shown therein. As table 114 moves in the direction of arrow A (FIGS. 6 and 7) towards and into a "table front" position (as shown in FIG. 8), cam follower roller 156 moves into cam surface 160 of cam block 162 and the action of spring 132 upon bell cranks 126 and 128 is such as to move control blade 130 and its nose 134 into coaction with faces 136 of lifter blades 138 in the manner and for purposes to be hereinafter described.

A lifter reset bar 170 (FIGS. 6 and 10) spans left side wall 40 and right side wall 48 and has its upper surface disposed for coaction with the under surfaces of lifter arms 138 to urge same, against the action of spring fingers 148, into a retracted position (as shown in FIG. 1) when table 114 is in the "table rear" position. As table 114 moves in the direction of arrow A (FIG. 6 and 7) towards and into the "table front" position (FIG. 8) the undersurface of lifter arms 138 separate from the upper surface of lifter reset bar 170 permitting spring fingers 148 to urge lifter fingers 150 into and through apertures 152.

A left hand locator arm switch 172 (FIGS. 6 and 10), carried by lifter reset bar 170, is provided with an actuator blade 174 disposed for coaction with the under side of a left hand locator arm 176 rockably disposed on pivot shaft 140. A right hand locator arm switch 178 (FIG. 10), carried by lifter reset bar 170, is provided with a switch actuator blade 180 disposed for coaction with the under side of a right hand locator arm 182 also rockably disposed on pivot shaft 140. Both left hand locator arm 176 and right hand locator arm 182 are formed with locating fingers (not shown) that are similar in appearance to locating fingers 150 of lifter arms 138. The fingers on arms 176 and 182 are disposed for movement through apertures 152 (FIG. 9) of table 114 occupying positions corresponding to row 12 columns 3 and 60 respectively of control record 32 (FIG. 2) and serve to locate record 32 on table 114 and to finely adjust the position thereof. The configuration of these fingers is slanted on the leading and trailing sides to facilitate this kind of positioning.

A left hand locator arm actuator 184 (FIGS. 6 and 10), fixedly secured to a locator arm shaft 186 journaled in left hand wall 40 and right hand wall 48 of reader 30, is formed with a lug 188 disposed for coaction with left hand locator arm 176, and a lug 190 disposed for coaction with an actuating blade 192 of a locator assembly switch 194 secured as at 196 to left side wall 40. A pin 198 (FIG. 6) pivotly interconnects left hand locator arm actuator 184 to a plunger 200 of a locator and lifter solenoid 202 approriately secured to left side wall 40 and interconnected into the circuitry of reader 30.

A right hand locator arm actuator 210, also fixedly secured to locator arm shaft 186 (FIG. 10), is formed with a lug 212 disposed for coaction with right hand locator arm 182.

A right hand lifter cam 220 (FIG. 5) fixedly secured to the right hand extremity of shaft 186 is formed with a cam track 222 to accommodate a lifter roller 224 carried by a right hand lifter bell crank 226 pivotly secured as at 228 to table 114. A left hand lifter cam 230 (FIG. 3) is fixedly secured to the left hand end of shaft 186 and formed with a cam track 232 to accommodate a lifter roller 234 carried by a left hand lifter bell crank 236 pivotly secured as at 238 to table 114. A lifter blade 240 (FIGS. 3 and 5) spans bell cranks 226 and 236 and is appropriately secured thereto for con-joint movement therewith.

A right hand cam track extension 244 fixedly secured to right hand side wall 48 (FIG. 5) and a left hand cam track extension 246 fixedly secured to left hand side wall 40 (FIG. 3) also cooperate with rollers 224 and 234 respectively to guide the movement thereof and through their associated bell cranks 226 and 236 the movement of table 114 from its "table rear" position (FIG. 6) to its "table front" position (FIG. 8).

A plurality of grooves 250–9 through 250–0 and 250–11 (FIGS. 6 and 9) are formed in the upper surfaces of table 114 in positions corresponding to rows 9 through 0 and 11 of control record 32. Grooves 250 are formed for coaction with hook ends 252 of indicia sensing slides 254 disposed for movement in slots 256 (FIGS. 6 and 9) formed in a table plate 258 removeably disposed above table 114. A slot 260 is formed in a slot plate 262, fixedly disposed between left side wall 40 and right side wall 48, for each slide 254. A cam block 264 is fixedly disposed on table plate 258 for coaction with the front ends of slides 254. A rear hook 266 is formed of the rear end of each indicia sensing slide 254 for mating engagement with a hook 270 (FIGS. 6 and 11) formed on a value entry actuator or slide 272 located in print-punch machine 20.

A lifter ramp 276 (FIGS. 6 and 8) is formed on the under side of each indicia sensing slide 254 for coaction with lifter fingers 150 of lifter arms 138.

A plurality of checker arms 280 (FIGS. 6 and 9), each disposed for coaction with the upper surface of an indicia sensing slide 254, are rockably mounted upon a pivot shaft 282 fixedly supported in an upper structure mounting assembly 284 carried on a hinge shaft 286 journaled between left side wall 40 and right side wall 48. A spring comb 288, appropriately secured to assembly 284 is formed with a plurality of spring fingers 290 each disposed for coaction with a tail end 292 of a checker arm 280. A beak end 294 is formed on each checker arm 280 for coaction with a checker bail 296 fixedly secured to a bail shaft 298 appropriately journaled in assembly 284. A spring 300 (FIGS. 5 and 9), fixedly secured at one of its ends to assembly 284 and at its other end to bail shaft 298, urges bail shaft 298 and bail 296 in the counter-clockwise direction (FIG. 5) about the axis of rotation of shaft 298 and against the action of a solenoid spring 302 (FIG. 3) disposed about a plunger 304 of a checker solenoid 306 appropriately mounted on assembly 284, Solenoid spring 302 is stronger than spring 300 and therefore when solenoid 306 is de-energized spring 302 maintains bail 296 rocked into its at rest position (FIG. 6).

Checker solenoid 306 is appropriately wired into the circuitry of reader 30 and when energized draws plunger 304 in the direction of arrow B (FIG. 3) to rock checker bail 296 in the counter-clockwise direction (FIG. 6) about the axis of roation of shaft 298 and move same from its at rest position (FIG. 6) to its "O-K checked" position as shown in FIG. 8. In the process of such movement a nose 308, formed on checker bail 296, must move into a space 310 (FIG. 8) created between beak ends 294 only if all checker bails 280 have functioned properly. By functioning properly is meant that all indicia sensing slides 254 have assumed either a perforation sensing position or a manual setting position. A perforation sensing position is assumed by a sensing slide 254 when its hook end 252 has passed through a perforation 36 of control record 32 and into groove 250 of table 114 (as shown for slide 254-*n*). A sensing slide 254 assumes a manual setting position when its ramp 276 climbs up on a lifter finger 150 of a lifter arm 138 which has passed through a perforation 36 in the 12 row of control record 32 (as shown for indicia sensing slide 254-*o*).

An indicia sensing slide 254 has functioned improperly when its nose 252 has passed over a control record 32 without having passed through a perforation 36; and when its ramp 276 has not climbed onto a lifter finger 150 because there was no perforation in the 12 row. The reason for this failure may be that hook end 252 skipped over a perforation 36 without passing through same, or that for one reason or not there was no perforation in the column being sensed. In either case indicia sensing slide 254 would assume a position on top of control record 32 similar to that shown for indicia sensing slide 254-*o* in FIG. 7; it being udnerstood that such improperly functioning indicia slide 254 would, however, have passed over the entire data record at the time it is being so checked. Beak end 294 of any checker arm 280 associated with an improperly functioning indicia sensing slide 254 would occupy a position in space 310. Upon energization of checker solenoid 306 and corresponding movement of checker bail 296, nose 308 of checker bail 296 will strike the beak end 294 of checker bail 280 and further movement of checker bail 296 will be arrested. The subsequent functioning of record reader 30 following a "no check" operation of checker bail 296 will be explained hereinafter along with the explanation of the overall operation of record reader 30.

An extension 320 (FIG. 3) of plunger 304 of solenoid 306 is disposed for coaction with an actuator blade 322 of a check completed switch 324 secured as at 326 to mounting assembly 284 and appropriately interconnected into the electrical circuitry of record reader 30. A check O-K switch 330 (FIGS. 6 and 9) appropriately secured to mounting assembly 284 and interconnected into the electrical circuitry of record reader 30 is provided with an actuator blade 332 disposed for coaction with checker bail 296. A checker retracted switch 339 (FIG. 9), appropriately secured to mounting assembly 284 and interconnected into the electrical circuitry of record reader 30, is provided with an actuator blade 338 disposed for coaction with checker bail 296.

A right hand mounting assembly latch 340 (FIGS. 5 and 9) is pivotly mounted at 342 to right hand side wall 48 and a left hand mounting assembly latch 344 (FIGS. 3 and 9) is pivotly mounted as at 346 to left hand side wall 40. Movement of right hand mounting assembly latch 340 in the clockwise direction about its pivot 342 (FIG. 5) and of left hand mounting assembly latch in the counter-clockwise direction about its pivot 346 (FIG. 3) releases them from their respective positions of coaction with mounting assembly 284. This will permit movement of mounting assembly 284 in the counter-clockwise direction about its hinge shaft 286 and access to the elements thereunder. The latching of right hand mounting assembly latch 340 and left hand mounting assembly latch 342 secures mounting assembly 284 in place with respect to table plate 258 and table 114 to facilitate the coaction between the elements of record reader 30.

There is a value entry actuator or slide 272 (FIG. 11) for each indicia sensing slide 254. Each slide 272 is provided with a set of first teeth 352 disposed for coaction with teeth 354 on a print-wheel 356 upon which is formed a plurality of printing type faces 358. A second set of teeth 360 are formed on each slide 272 for coaction with a gear 362 carried on a shaft 364 appropriately mounted in punch marking machine 20. A gear 366 is affixed to the other end of shaft 364 and formed with teeth disposed for coaction with teeth 368 formed on an interposer assembly 370 which also has formed thereon interposer lugs 372 selectively positionable for coaction with punch elements 374. A detent 376 is disposed for coaction with notches 378 formed on each slide 272.

Slide 272, print wheel 366, interposer assembly 370, and punch elements 374 cooperate as described in U.S. Pat. No. 2,708,873 to K.J. Braun to print information upon and perforate indicia into a data record 28.

Each slide 272 furthermore has appropriately secured thereto a key 24 of keyboard 22 to facilitate manual setting thereof and thereby of print-hwheel 366 and interposer assembly 372.

The operation of record reader 30 will be explained with reference to the schematic diagram of FIG. 13. It will be assumed that appropriate power is supplied to unit 30, and punch marking machine 20, through lines PS1 and PS2.

With such power turned on and with table 114 in the "table rear" position (FIG. 6), the only completed circuit to note at this time is the one to locator and lifter solenoid 292 (FIGS. 6 and 13) through PS1, the contacts of switch 82 (FIGS. 5 and 13), a conductor 400, the contacts of a set switch 402 appropriately disposed on record reader 30, a conductor 404, a conductor 406, solenoid 202, a conductor 408, the normally closed contact of checker retracted switch 336 (FIGS. 9 and 13), a conductor 410, a conductor 412 to PS2.

Solenoid 202 is therefore energized drawing in its plunger 200 (FIG. 6) against the action of spring 204 to rock locator arm actuator 184 and its shaft 186 in its clockwise direction about the axis of rotation of shaft 186. This action moves actuator 184 and actuator 210 (FIG. 10) into engagement with their respective arms 176 and 182 to rock same in a clockwise direction (FIG. 6) about pivot shaft 40 and withdraw their respective locator fingers down through apertures 152 on table 114. The operator next inserts control record 32 onto table 114 until a stop appropriately provided thereon arrests the positioning thereof with its columns aligned with indicia sensing slides 254. Set switch 402 is then actuated to transfer its contacts to a conductor 414 (FIG. 13). This opens the circuit to solenoid 202 de-energizing same and permitting spring 204 (FIG. 6) to rock locating arm actuator 184, shaft 186, and actuator 210 in the counter-clockwise direction from their positions of coaction with locator arms 176 and 182. Spring fingers 148 thereafter rock locator arms 176 and 182 in the counter-clockwise direction about pivot shaft 140 projecting their respective locating fingers up through apertures 152 (FIGS. 6 and 9) of table 110 and through appropriate locating holes disposed in the 12 row of columns 3 and 60 of control record 32. This locates and provides a fine adjustment of the alignment of control record 32 as previously described. Counter-clockwise rotation of locator arms 176 and 182 also operates switch actuator blades 176 (FIG. 10) and 180 respectively to close the contacts of locator arm switches 172 and 178. This action completes a circuit from PS1 through the contacts of switch 82, conductor 400, the contacts of actuated set switch 402, a conductor 414, the closed contacts of switches 178 and 172, a conductor 416, conductor 418, the normally closed contacts 420-1 of a coil 420, a coil 422, a conductor 424, the normally closed contacts of checker retracted switch 336 (FIGS. 9 and 13), a conductor 410 (FIG. 13), a conductor 412, to PS2.

Coil 422 is therefore energized closing contacts 422-1 thereof to provide power to motor 70 through PS1 and PS2. Such power would not, however, have been provided if the contacts 17 either switch 174 or switch 178, or both, had remained opened because control record 32 was not properly located on table 114, or because the locating perforations for row 12 of columns 3 and 60 has not been properly punched in control record 32. The absence of properly aligned locating perforations by preventing movement of the locating fingers of locator arms 176 and 182 up through apertures 152 and the corresponding coaction of arms 176 and 182 with switch actuator blades 174 and 180, prevents operation of switches 172 and 178 and the contacts therein remain opened. With the circuit to coil 422 thus open and contacts 422-1 also open motor 70 remains de-energized.

The operator, following a failure of motor 70 to operate, must check the condition of control record 32 to make sure that locating perforations appear in row 12 of columns 3 and 60, and to see that control record 32 is properly positioned on table 114. Assuming there is nothing else wrong with the system repeating the previously described operations should result in energization of motor 70.

Operation of motor 70, through its shaft 74, turns plate cam 72 in the clockwise direction (FIG. 5) about the axis of rotation of shaft 74 moving drive bar 86, eccentrically connected thereto through pin 88, in the direction of arrow X. This action rocks right drive arm 92 and cross shaft 96 in the counter-clockwise direction about the axis of rotation of shaft 96 and through shaft 96 rocks left drive arm 98 (FIG. 3) in the clockwise direction about the axis of rotation of shaft 96. The resulting coaction between the walls of slots 102 and 104 respectively of arm 98 and 92 with rollers 106 and 108 effects a movement of table 114 from its "table rear" position (FIG. 6) in the direction of arrow A towards its "table front" position (FIG. 8).

The initial rotation of cam 72 (FIG. 5) through the coaction between roller 78 of switch 82 and the surface of cam 72, effects a transfer of the contacts in siwtch 82 to establish a hold circuit for coil 422. This can be traced from PS1 to the transferred contacts of switch 82, a conductor 426, the contacts of switch 84, conductor 428, conductor 418, contacts 420-1 of coil 420, coil 422, conductor 424, contacts of switch 336 conductor 410, conductor 412 to PS2. The operation may therefore release set switch 402.

Motor 70 continues to operate and as table 114 moves into its "table front" position (FIG. 8) roller 80 of switch 84 (FIG. 5) moves into notch 76 on cam 72. The contacts in switch 84 transfer into engagement with a conductor 430 opening the hold circuit to coil 422. Contacts 422-1 of coil 422 also open and motor 70 is de-energized. The movement of table 114 stops with table 114 in the "table front" position. During the movement of table 114 in the direction of arrow A hook ends 252, of indicia sensing slides 254, first move off a cam block 264 (FIG. 7) and onto the surface of control record 32. As table 114 continues to move in the direction of arrow A hook ends 252, of indicia sensing slides 254, move through any perforations 36 punched in rows 9 through 0 control record 32 and into a corresponding groove 250 in the surface of table 114.

Coaction between the side walls of grooves 250 and hook ends 252 mates the two together and continued movement of table 114 in the direction of arrow A moves the interconnected indicia sensing slides 254 in the direction of arrow A a distance corresponding to the value punched in record 32. Accordingly, the value entry actuators 272 (FIG. 11), associated with indicia sensing slides 254, are also moved to position their respective print-wheels 356 and interposer assemblies 370.

Movement of hook ends 252, of indicia sensing slides 254, through apertures 36 in control record 32 also results in a counter-clockwise rotation of their associated checker arms 280 about the axis of rotation of pivot shaft 282 and against the action of spring fingers 290. Beak ends 294 of such checker arms 280 therefore drop below the level of nose 308 of bail 296 (as seen in FIG. 8 for checker arm 280-*n*).

It may be that all the columns of control record 32 contain perforations 36 in rows 9 through 0 thereof. It may, however, be desired to manually set certain columns of keyboard 22 of machine 20. To set this up through reader 30 requires the punching of perforations 36 in the 12 row of the appropriate column or columns of record 32. When table 114 began its movement, in the direction of arrow A, the under surfaces of lifter arms 138 (FIG. 7) moved off of the upper surface of lifter reset bar 170. Spring fingers 148, acting on lifter arms 138, pivot same in the counter-clockwise direction about pivot shaft 140 projecting lifter fingers 150 of those lifter arms 138 aligned columns having a perforation 36 in the 12 row through said perforation 36 and above the upper surface of table 114. The presence of card stock in the 12 row of any column which does not contain a perforation 36 is sufficient to prevent the movement of the corresponding lifter finger 150 above the surface of table 114. Continued movement of table 114 in the direction of arrow A, through depending support arms 120 (FIG. 4) and 122 and under the influence of spring 132, results in coaction between cam follower roller 156 and cam surfaces 158 and 160 on cam block 162. As follower roller 156 mvoes onto cam surface 160 (FIG. 6) spring 132 (FIG. 4) rocks bell crank 126 and lifter control shaft 124 in the clockwise direction (FIG. 7) moving nose 134 of lifter control blade 130 against faces 136 of lifter arms 138 (FIG. 8). This action nulifies the action of spring fingers 148 on lifter arms 138 and stabilizes positioning of same. Such stabilization is especially important for those lifter arms 138 which have fingers 150 projected above the upper surface of table 114. Lifter fingers 150 so disposed will coact with ramps 276 on indicia sensing slides 254 to lift same to a manually settable position (as shown for indicia sensing slide 254-*o* in FIG. 8). Checker arms 280 associated with lifted slides 254 are rocked in the clockwise direction about shaft 282 (FIG. 8) and their beak ends are raised above the level of nose 308 of checker bail 296.

When all beak ends 294 of checker arms 280 are positioned either below nose 308 of checker bail 296 or above nose 308 of checker bail 296, checker bail 296 can move into its "O-K checked" position in space 310 as shown in FIG. 8. Should a beak end 294 of a checker arm 280 remain in space 310 preventing entry of nose 308 into space 310 then checker bail 296 will not be able to move into its "O-K checked" position. This will occur when a hook end 252 misses a perforation 36 in control recrod 32, or when a preforation has not been provided in a column of control record 32.

Figure 13:
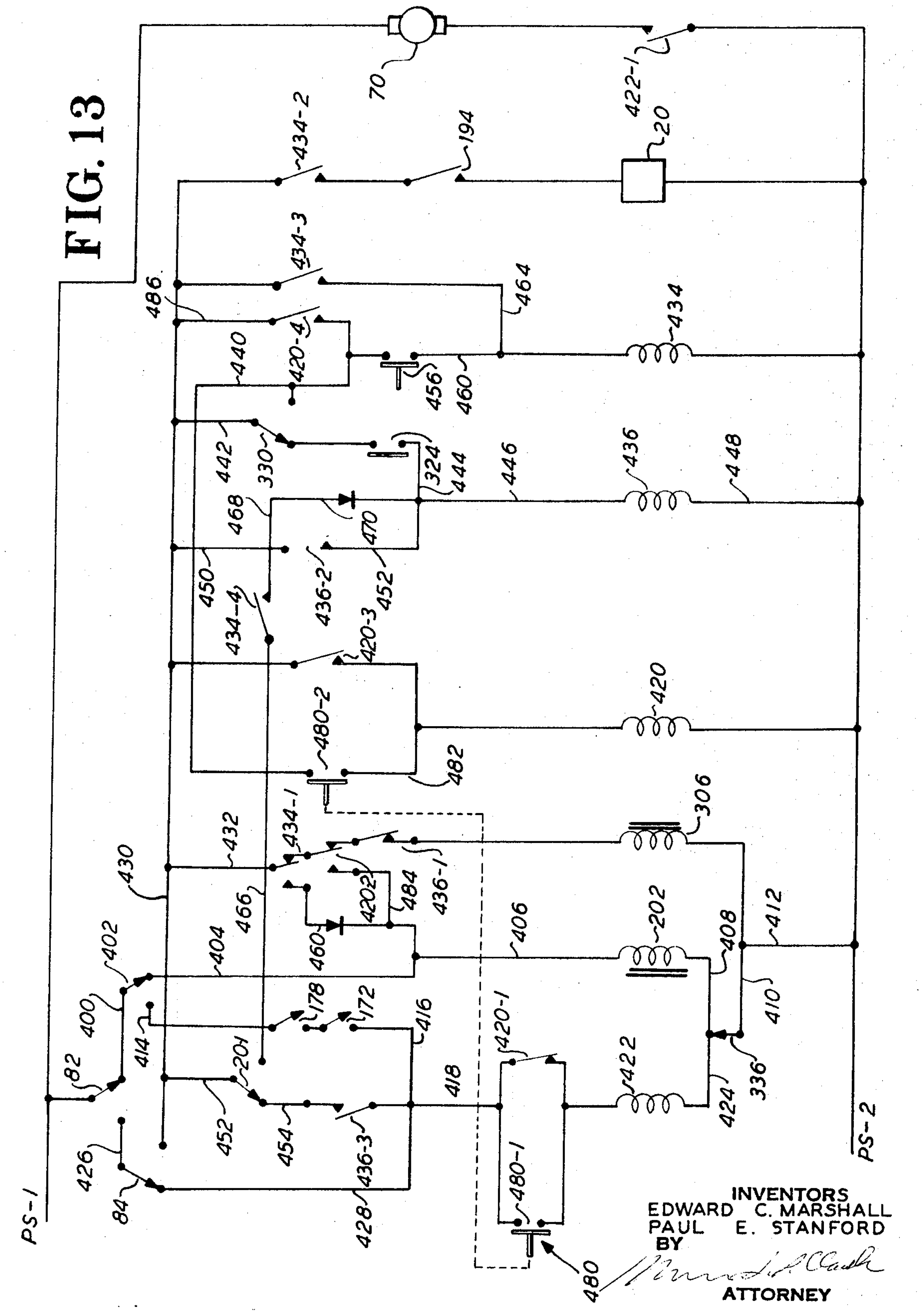
FIG. 13 is a schematic diagram of the circuitry for controlling the record reader of FIG. 1.

Movement of checker bail 296 towards its "O-K checked" position, to check for proper functioning of indicia sensing slides 254, is initiated following movement of table 114 into its "table front" position and in response to the previously described transfer of the contacts in switch 84 (FIGS. 5 and 13). Such contact transfer establishes a circuit from PS1 through the contacts of switch 82 now in engagement with conductor 426, the contacts of switch 84, conductor 430, a conductor 432, the normal closed contacts 434-1 of a coil 434, the normally closed contacts 420-2 of coil 420, the normally closed contacts 436-1 of a coil 436, a conductor 438, checker solenoid 306, conductor 412 to PS2 and solenoid 306 is energized.

Energization of solenoid 306 effects a movement of its plunger 304 (FIG. 3) in the direction of arrow B, and a corresponding movement (clockwise in FIG. 3 and counter-clockwise in FIG. 6) of checker bail 296 about the axis of rotation of bail shaft 298. Nose 308 of checker bail 296 is thus moved towards space 310 (FIG. 10) created between beak ends 294 of checker arms 280 and will move into same if all indicia sensing slides 254 and their associated checker arms 280 have properly functioned.

Energization of checker solenoid 306 always operate switch 324 (FIG. 3) associated therewith for reasons to be hereinafter explained. If bail 296 moves into its "O-K checked" position such movement operates switches 330 (FIG. 4) and 336 through their respective actuating blades 332 and 338 for reasons to be hereinafter explained.

When checker bail 296 is blocked from entering into its "O-K checked" position by the disposition of a beak end 294 in space 310 a circuit is established from PS1 through the contacts of switch 82, conductor 426, the contacts of switch 84, conductor 430, a conductor 442, the not transferred contacts of switch 330 (since bail 296 cannot move), the contacts of transferred switch 324, a conductor 444, a conductor 446, coil 436, a conductor 448 to PS2. This circuit energizes coil 436 transferring contacts 436-1, 436-2, and 436-3 thereof.

The transfer of contacts 436-2 establishes a hold circuit for coil 436 through PS1, the contacts of switch 82, conductor 426, the contacts of switch 84, conductor 430, a conductor 450 contacts 436-2, a condcutor 452, conductor 446, coil 436, conductor 448, and PS2, The transfer of contacts 436-1 removes checker solenoid 306 from the circuit permitting spring 302 (FIG. 3) disposed about plunger 304 of solenoid 306 to rock checker bail 296 in the counter-clockwise direction (FIG. 3) about the axis of rotation of shaft 298 to return bail 296 to its un-actuated condition. This action opens the contacts of switch 324, but, since the just described hold circuit has been established coil 436 remains energized.

Closing of contacts 436-3 establishes a new circuit for coil 422 associated with motor 70 through PS1, the contacts of switch 82, conductor 426, the contacts of switch 84, conductor 430, a conductor 452, the contacts of switch 20-1, a conductor 454, contacts 436-3, a conductor 418, contacts 420-1 of coil 420, coil 422, a conductor 424, switch 336, conductor 410, conductor 412 to PS2. Energization of coil 422 closes its contacts 422-1 establishing the previously described circuit to motor 70.

Operation of motor 70 now acts through drive shaft 74 (FIG. 5), cam plate 72, eccentrically located pin 88, drive bar 86, drive arm 92, shaft 96, drive arm 98 (FIG. 3), rollers 106 and 108 to return table 114 in the direction of arrow B from the "table front" position (FIG. 8) to "table rear" position (FIG. 6). As the contacts of switch 84 transfer away from conductor 430, due to the movement of notch 76 (FIG. 5) of cam 72 away from roller 80 associated therewith, a circuit for the continued operation of coil 422 and motor 70 is established. This may be traced from PS1 through the contacts of switch 82, conductor 426, the returned contacts of switch 84, conductor 428, conductor 418, contacts 420-1, coil 422, conductor 242, contacts of switch 336, conductor 401, conductor 412, to PS2.

When table 114 moves into its "table rear" position (FIG. 6) cam notch 76 coacts with roller 78 to transfer the contacts of switch 82; moving same away from conductor 426 and opening the circuit to coil 422. As coil 422 is deenergized its contacts 422-1 open and the circuit to motor 70 is opened de-energizing motor 70 and terminating the drive therefrom. This transfer of the contacts of switch 82 reestablishes the previously described circuit to lifter and locator solenoid 202 through conductor 400 withdrawing the locating fingers associated with locating arms 176 and 182 down beneath the level of the upper surface of table 114 to permit withdrawl of control record 32.

The operator may thereafter check the perforated indicia in control record 32 to make sure that perforations 36 appear where they should appear, and may otherwise check the condition of record reader 30 to determine why checker bail 296 did not provide an "O-K checked" condition. After rectifying whatever problem produced the no check condition the operator repeats the previous operations until record reader 30 provides an "O-K checked" condition.

When checker bail 296 moves into its "O-K checked" position the contacts of switch 336 (FIGS. 9 and 13) associated therewith open. However, this action is of no consequence since it neither completes a required circuit nor opens a completed circuit at this time.

Movement of bail 296 into its "O-K checked" position also transfers the contacts in switch 330 (FIGS. 9 and 13) associated therewith before the operation of solenoid 306 closes the contacts in switch 324. Thus the previously described circuit to coil 434, which effected return of table 114 to its "table rear" position when checker bail 296 could not move into its "O-K checked" position, is open at the contacts of switch 330 and table 114 remains in its "table front" position. The operator recognizing this knows that checker bail 296 indicates an "o-K checked" condition and can continue the routine.

The operator is now at liberty either initiate operation of punch marking machine 20, or to go into an override mode of operation wherein any or all settings through reader 30 may be bypassed and machine 20 set up through its keyboard 22.

If the operator is satisfied with the data entered through control record 32 and reader 30 the, to initiate operation of punch marking 20, the operator need only operate a start button 456 (FIG. 13) appropriately located on machine 20. It should be remembered that table 114, at this point in the cycle, is in its "table front" position and that checker bail 296 is providing an "o-K checked" indication. Operation of buttom 456 establishes a circuit to coil 434 through PS1, the contacts of switch 82, conductor 426, the contacts of switch 84, conductor 430, conductor 442, the transferred contacts of switch 330, a conductor 458, the contacts of button 456, a conductor 460, coil 434, to PS2. Energization of coil 434 transfers contacts 434-1, 434-2, 434-3, 434-4 thereof.

Figures 11, 12:
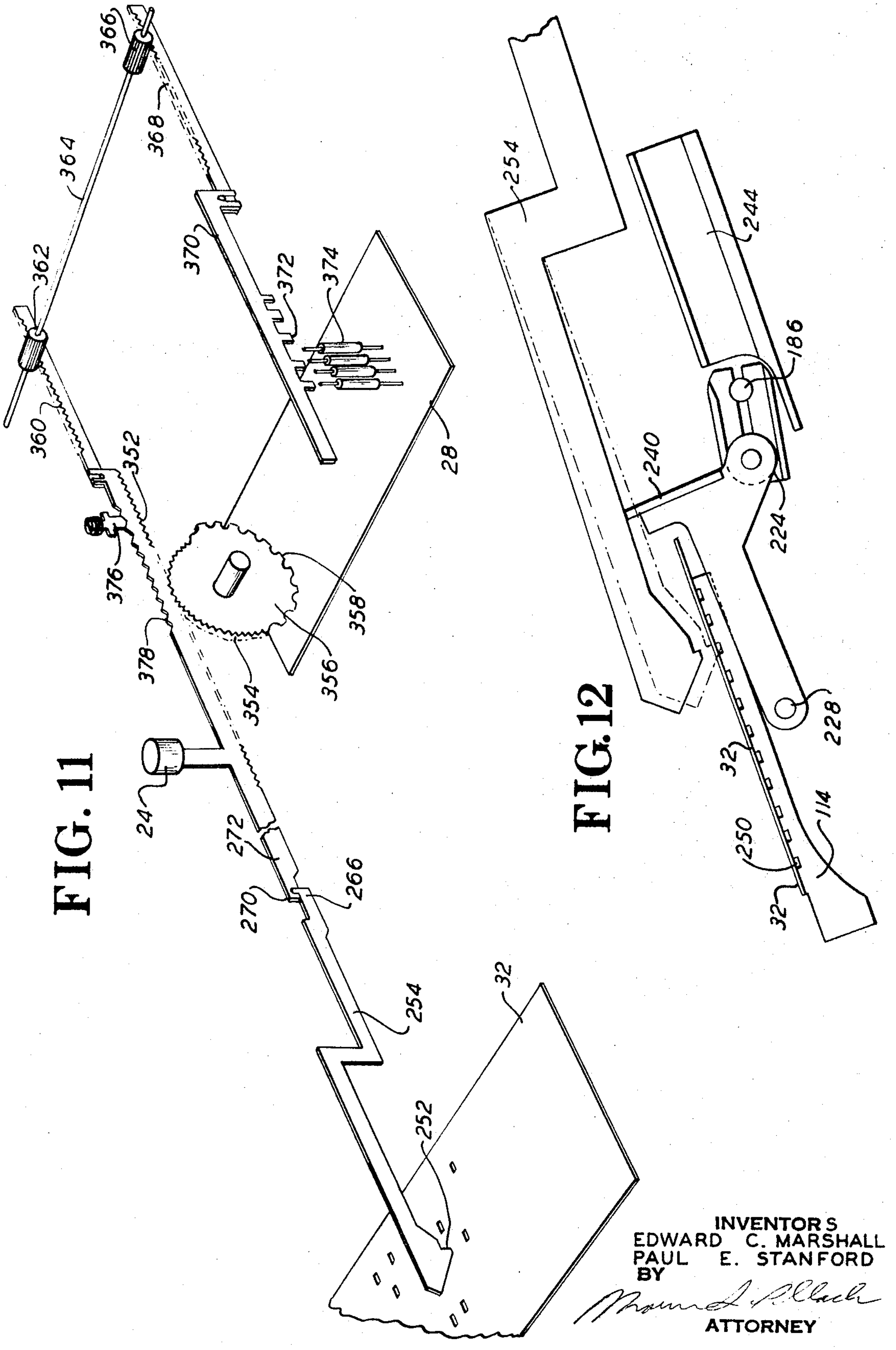
FIG. 11 is a view similar to FIG. 9 with additional elements removed to better show details thereof.
FIG. 12 is a schematic showing of a view similar to FIG. 9 showing disengagement of the slides from the data record.

Transfer of contacts 434-1 establishes a new circuit to locator and lifter solenoid (FIGS. 6 and 13) through PS1, the contacts of switch 82, conductor 426, the contacts of switch 84, conductor 430, conductor 432, the transferred contacts 434-1, a conductor 460, conductor 406, solenoid 202, conductor 408, the contacts of switch 336, conductor 410, conductor 412, to PS2. Energization of solenoid 202 (FIG. 6) through its plunger 200 and actuator 184, serves to rock shaft 186 (FIGS. 5 and 6) in the clockwise direction (FIG. 5) carrying with its lifter cams 220 (FIG. 5) and 230 (FIG. 3). Since table 114 is in its "table front" position (FIG. 8) lifter cams 220 and 230 act on their associated rollers 224 and 234 to rock bell cranks 226 and 236 respectively to raise lifter blade 240 to a lifted position therefore as shown in FIG. 12. This action removes all indicia sensing slides 254 from their respective positions with hook ends 252 thereof engaged in grooves 250 of table 114. Such action is necessary because mechanisms within punch marking machine 20 must effect an alignment adjustment of value entry actuators 272 and their associated elements and this requires that some degree of play be available in order to permit slight movements thereof. If slides 254 are in mating engagement with grooves 250 of table 114 movement thereof, and of actuators 272 associated therewith would be impossible.

Energization of locator and lifter solenoid 202 (FIG. 6) and the resulting clockwise rotation of actuator 184 about the axis of rotation of shaft 186 also brings lug 190, carried by actuator 184, into contact with actuator blade 192 to close the contacts within switch 194 (FIGS. 6 and 13).

Closing of the contacts of switch 194 together with the closed contacts 434-2 of coil 434 establishes an energization circuit for punch marking machine 20. This may be traced from PS1 through the contacts of switch 82, conductor 426, the contacts of switch 84, conductor 430, contacts 434-2 of coil 434, the contacts of switch 194, punch mark machine 20, to PS2. Punch marking machine 20 proceeds through its cycle of operation ot effect printing upon and punching in record 28.

It should be noted that the closing of contacts 434-3 establishes a hold circuit for coil 434 through PS1, the contacts of switch 82, conductor 426, the contacts of switch 84, conductor 430, a conductor 462, contacts 434-3, a conductor 464, coil 434 to PS2. This permits release of start button 456. It should be further noted that the closing of contacts 434-4 along with the transfer of contacts 20-1 (which transfer due to the energization of punch marking machine 20), establishes a circuit energizing coil 436 from PS1, through the contacts of switch 82, conductor 426, the contacts of switch 84, conductor 430, conductor 452, contacts 20-1, a conductor 466, contacts 434-4, a conductor 468, a conductor 470, conductor 446, coil 436, conductor 448, to PS2.

Energization of coil 436 transfer contacts 436-1, 436-2, and 436-3 thereof. Transfer of contacts 436-1 is of no significance since the circuit to checker solenoid 306 is already open due to transfer of contacts 434-1. Transfer of contacts 436-2 establishes the previously described hold circuit for coil 436. Transfer of contacts 436-3 establishes a circuit for later use in energizing motor 70 to return table 114 to "table rear" position following completion of operation of machine 20.

When punch marking machine 20 has completed making the required number of records 28 its internal mechanism will terminate operation thereof and transfer contacts 20-1. This action establishes a circuit from PS1 through the contacts of switch 82, conductor 426, the contacts of switch 84, conductor 430, conductor 452, contacts 20-1, conductor 454, contacts 436-3, conductor 418, contacts 420-1, coil 422, conductor 424, the contacts of switch 336, conductor 410, conductor 412, to PS2. Coil 422 is thus energized closing its contacts 422-1 to energize motor 70 as hereinbefore described.

Energization of motor 70 operates in the manner hereinbefore described to return table 114 to "table rear" position (FIG. 6). As previously described movement of table 114 in the direction of arrow A from its "table front" position (FIG. 8) to its "table rear" position (FIG. 8) first transfer the contacts of switch 84 to re-establish a hold circuit for coil 422, and terminating operation of motor 70 while at the same time re-establishing a circuit to lifter and locator solenoid 202 to retract the locator fingers and permit removal of control record 32.

It should also be noted that the transfer of the contacts of switch 84 from the circuit with conductor 430 de-energizes coil 436. Record reader 30 has thus been returned to its "at rest" condition.

If the operator desires to override some or all of the settings of indicia sensing slides 254 effected by reader 30 and control record 32 in order to set up punch marking machine 20 directly through keys 24 of keyboard 22, he must do so when table 114 is in the "table front" position (FIG. 8) and only after checker bail 296 has indicated an "O-K checked" condition. Upon actuation of an override switch 480 (FIG. 13) appropriately disposed on record reader 30 transfer of ganged contacts, 480-1 and 480-2 occurs simultaneously.

The closing of contacts 480-1 is of no consequence at this time since the circuit is open at 436-3. Closing of contacts 480-2 results in energization of coil 420 through PS1, the contacts of switch 82, conductor 426, the contacts of switch 84, conductor 430, conductor 442, the transferred contacts of checker O-K switch 330, conductor 440, contacts 480-2, a conductor 482, coil 420 to PS2.

Energization of coil 420 transfers contacts 420-1, 420-2, 420-3, and 420-4 thereof.

The transfer of contacts 420-1 opens the circuit to coil 422 but this action is of no consequence at this time.

Transfer of contacts 420-2 establishes a circuit to energize lifter and locator solenoid 202 from PS1 through the contacts of switch 82, conductor 426, the contacts of switch 84, conductor 430, conductor 432, contacts 434-1, contacts 420-2, a conductor 484, conductor 460, conductor 406, solenoid 202, conductor 408, contacts 336, conductor 410, conductor 412 to PS2. This action with table 114 in the "table front" position through actuator 184 (FIG. 6) operates on lifter blade 240 to raise indicia sensing slides 254, in the manner previously described, to the position thereof as shown in FIG. 12 and to close the contacts in switch 194.

The closing of contacts 420-3 establishes a hold circuit for coil 420, from PS1, through the contacts of switch 82, conductor 426, the contacts of switch 84, conductor 430, contacts 420-3, coil 420, to PS2.

The closing of contacts 420-4 prepares a circuit over conductor 430 through a conductor 486 and a conductor 488 so that upon subsequent actuation of start button 456 operation of punch marking machine 20 may be initiated as hereinbefore described.

Prior to actuating start button 456 the operator may change the settings of any value entry slide 272 through its associated key 22 to override the setting therein effected through record reader 30 and control record 32. The just described raising of sensing slides 254 releases same and slides 272 to permit such action thereafter operating start button 456 the operator initiates operation of punch marking machine 20 to effect printing upon and the perforation of indicia in record 28, as hereinbefore described.

In the override mode, however, when punch marking machine 20 has completed its operation, table 114 is not returned to its table rear position because contacts 420-1 and 480-1 are open. There is no way of energizing the coil 422 and, with contacts 422-1 thereof open, of energizing motor 70. The operator may thus continue to reset value entry slides 272 manually until t is desired to again place record reader 30 in control of the operation thereof. At such time the operator need only again operate override switch 480 closing contacts 480-1 thereof and establishing a circuit to coil 422 through conductors 418 and 454 as hereinbefore described.

The initial movement of table 114 from its table front position (FIG. 8) transfers the contacts of switch 84 over to conductor 428 opening the circuit to coil 420. The reclosing of contacts 420-1 of coil 420 maintains the circuit for coil 422 and through its contacts 422-1 to motor 70 permitting the operator to release override switch 480. The re-transfer of contacts 420-2 of coil 420 opens the circuit to lifter and locator solenoid 202. The locating fingers are retracted from control record 32 and record reader 30 is returned to its idle condition.

From the above description it will thus be seen that a novel and improved data processing system has been provided wherein a business machine, having selectively settable instrumentalities, is interconnected to an imput device having displaceable elements controlling the setting of the selectable instrumentalities; wherein the input device incroporates means for checking to determine that the displaceable elements have properly functioned, and wherein the input device incorporates means to either automatically permit manual entry into certain columns of the business machine through its keyboard, or to override all the settings of the displaceable elements and permit manual entry into any column of the business machine through its keyboard.

It is understood that although we have shown the preferred form of our invention, that various modifications may be made in the details thereof without departing from the spirit as comprehended by the following claims.

What is claimed:

1. An input device comprising:

a. a plurality of elements each selectively differentially settable from a given position to one of a plurality of selectable positions, each of at least some of said selectable positions being respectively representative of different items of data information;

b. selection means for determining the position that each of said settable elements is to be set to;

c. drive means for setting each of said settable elements to the position determined by said selection means;

d. checking means coacting with each of said settable elements to check the functioning of said elements after said elements have been positioned;

e. means providing an indication as to whether or not said settable elements have functioned properly;

f. said selection means coacting with said settable elements to position the latter for manual selection of the position that said settable elements are to be set to; and g. means for bypassing said selection means to permit manual selection of said settable elements.

2. An input device comprising:

a. a plurality of elements each selectively differentially settable from a given position to one of a plurality of selectable positions, each of at least some of said selectable positions being respectively representative of different items of data information;

b. selection means for determining the position that each of said settable elements is to be set to;

c. drive means for setting each of said settable elements to the position determined by said selection means;

d. checking means coacting with each of said settable elements to check the functioning of said elements after said elements have been positioned;

e. means providing an indication as to whether or not said settable elements have functioned properly;

f. said settable elements each being movable in a first direction when selected by said selection means and in a second direction when set by said drive means;

g. said checking means including:

1. a sensing means for each of said settable elements movable from a first position to a second position in response to selection of its associated settable elements; and
2. a checking member, coacting with all of said sensing means, movable into a predetermined position when all of said sensing means have moved to said second position and blocked from moving into said predetermined position by any sensing means which remains in said first position.

3. A reader for reading indicia arranged in columns and rows on a data record; comprising a. a sensing slide for each column of indicia;

b. selection means for effecting movement of each sensing slide in a first predetermined direction in response to sensing an indicia;

c. setting means for moving each selected sensing slide a distance corresponding to the value of the indicia sensed;

d. checking means responsive to the position of said sensing slides to indicate either that all of said sensing slides have moved in said first predetermined direction or that one or more of said sensing slides has not so moved;

e. said checking means including:

1. a checking arm disposed for coaction with each sensing slide and movable, in response to movement of said slide in said first predetermined direction, to a first checking position; and
2. a checking bail movable into a checking space created by movement of all of said checking arms into said first checking position to indicate that all sensing slides have operated to sense indicia;
3. said checking bail being blocked from movement into such space by the disposition therein of one or more checking arms which have not moved into said checking position to indicate that all sensing slides have not operated to sense indicia.

4. The device of claim 2: including a. means coacting with said selection means to selectively set one or more of said settable elements to a manually settable position to permit manual setting thereof;

b. each of said sensing means being settable to a third position in response to the setting of their associated settable element to said manually settable position; and c. said checking member being movable into said predetermined position even when a sensing means is set to said third position.

5. The device of claim 4: including circuit means associated with said checking means to provide a first indication when said checking member moves into said predetermined position and a second indication when said checking member is blocked from so moving.

6. The device of claim 5 wherein said second indication includes means to reset the device to a home position.

7. The reader of claim 3 including electric cicuit means associated with said checking means to provide either an indication that all sensing slides have functioned properly to sense indicia or an indication taht one or more of said slides has not properly functioned.

8. The reader of claim 7 wherein said circuit means indicates that one or more of said slides has not properly functioned by returning the reader to its condition prior to sensing the indicia.

9. The reader of claim 8 wherein said circuit means includes one or more switches responsive to movement of said checker bail.

10. The reader of claim 3: including a. other selection means for effecting movement of each sensing slide in a second predetermined direction in response to sensing a special indicia;

b. said movement of said slide in said second predetermined direction positioning same to permit manual selection of the distance to which the slide is set.

11. The reader of claim 14 wherein the checking arm associated with a sensing slide moved in said second predetermined direction moves to a second checking position clear of said checking space.

* * * * *

UNITED STATES PATENT OFFICE
CERTIFICATE OF CORRECTION

Patent No. 3,755,656 Dated August 28, 1973

Inventor(s) Edward C. Marshall et al

It is certified that error appears in the above-identified patent and that said Letters Patent are hereby corrected as shown below:

Column 18, line 58, "14" should be --10--

Signed and sealed this 27th day of August 1974.

(SEAL)
Attest:

McCOY M. GIBSON, JR.
Attesting Officer

C. MARSHALL DANN
Commissioner of Patents